Figure 1:
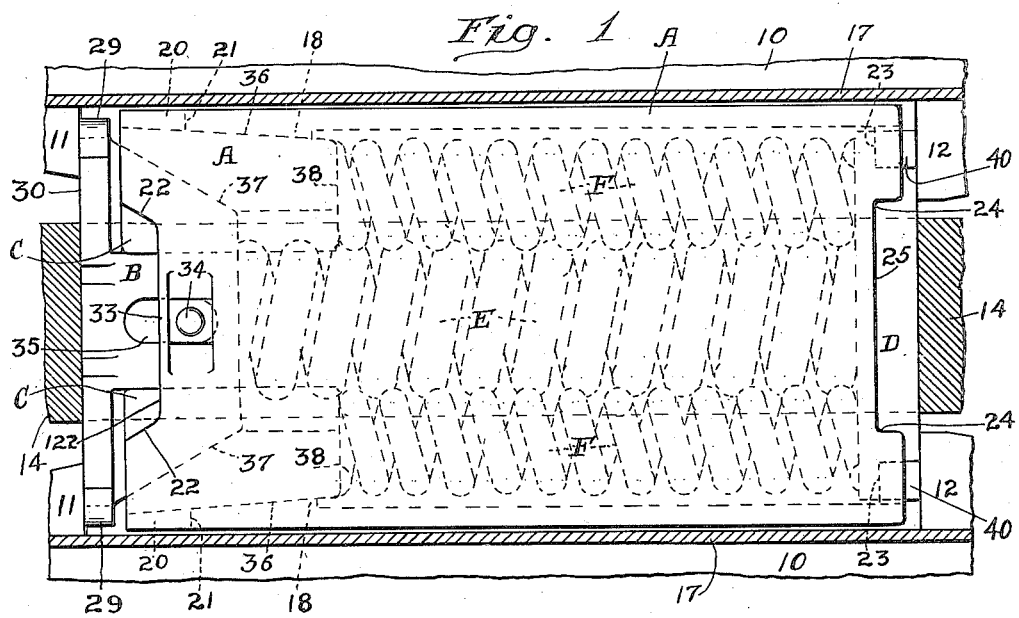

April 18, 1950     R. J. OLANDER     2,504,275
FRICTION SHOCK ABSORBING MECHANISM
Filed March 17, 1947     4 Sheets-Sheet 1

Inventor:
Roland J. Olander.
By Henry Fuchs
Atty.

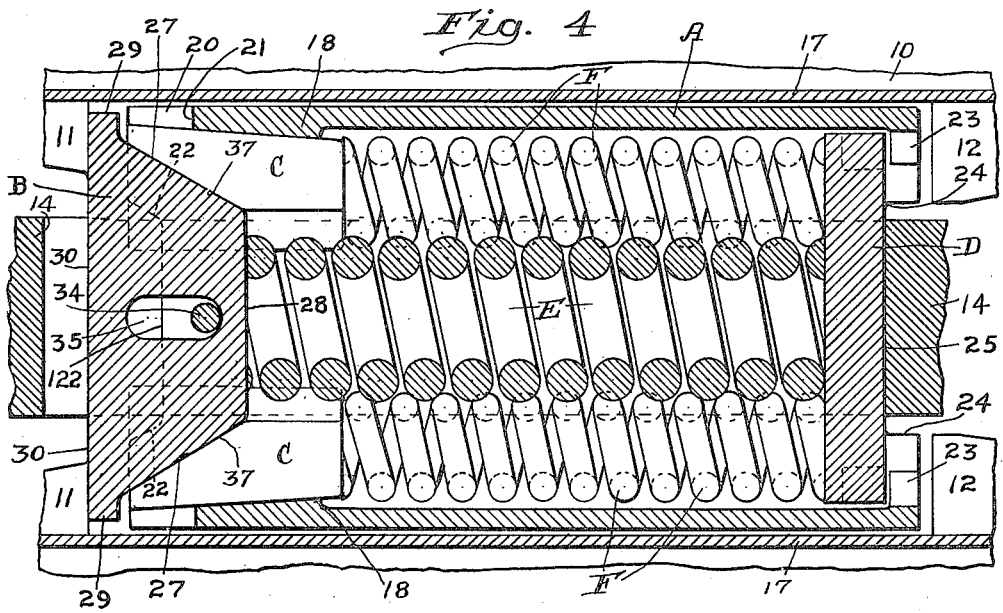
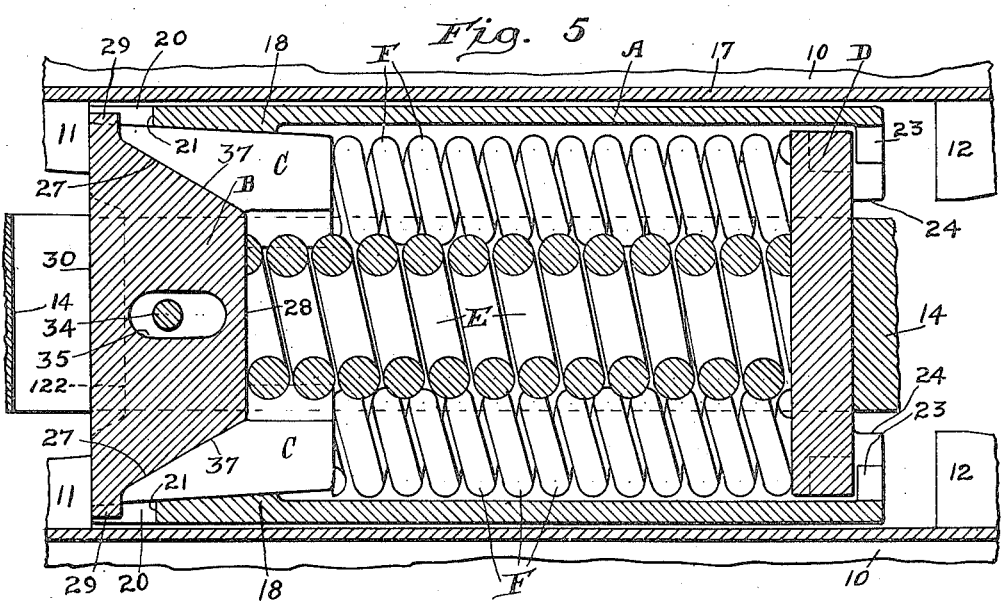

April 18, 1950          R. J. OLANDER          2,504,275
FRICTION SHOCK ABSORBING MECHANISM
Filed March 17, 1947          4 Sheets-Sheet 3
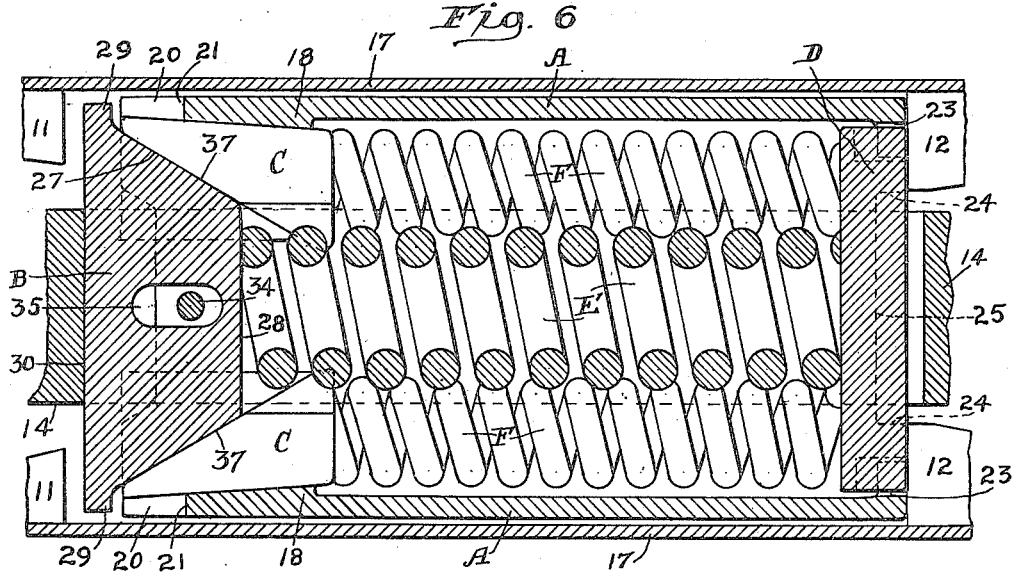
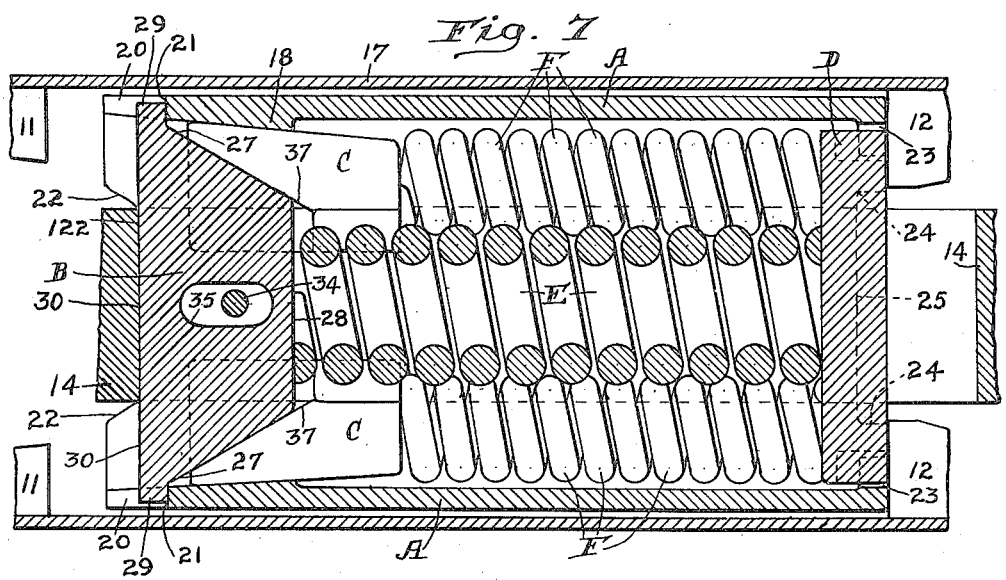
Inventor:
Roland J. Olander.
By Henry Fuchs
Atty.

April 18, 1950 R. J. OLANDER 2,504,275
FRICTION SHOCK ABSORBING MECHANISM
Filed March 17, 1947 4 Sheets-Sheet 4
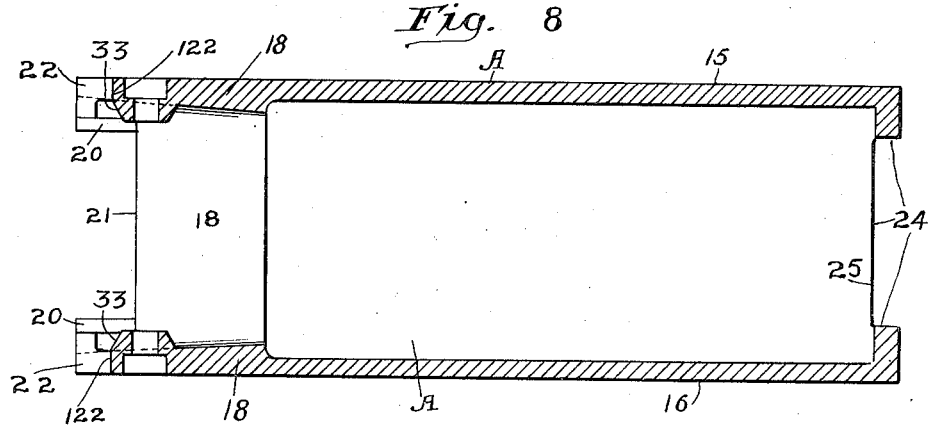
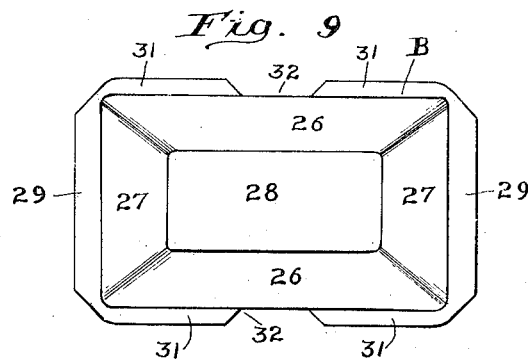
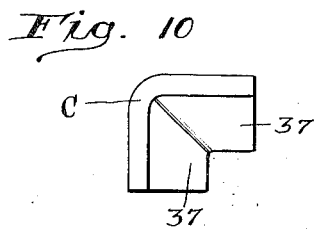
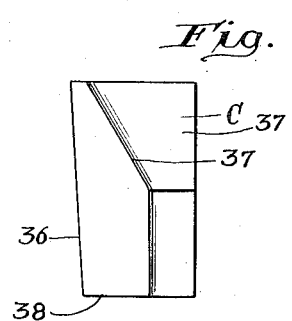
Inventor:
Roland J. Olander:
By Henry Fuchs.
Atty.

Patented Apr. 18, 1950

2,504,275

UNITED STATES PATENT OFFICE 2,504,275

FRICTION SHOCK ABSORBING MECHANISM

Roland J. Olander, Chicago, Ill., assignor to W. H. Miner, Inc., Chicago, Ill., a corporation of Delaware Application March 17, 1947, Serial No. 735,235

11 Claims. (Cl. 213—32)

This invention relates to improvements in combined spring and friction shock absorbing mechanisms for railway cars.

One object of the invention is to provide a friction shock absorbing mechanism having free spring action in both draft and buff, followed by higher frictional resistance designed so that both the spring and friction actions in draft differ in shock absorbing capacity from the corresponding actions in buff.

A further object of the invention is to provide a shock absorbing mechanism of the character indicated, having free spring action followed by frictional resistance in both draft and buff, so designed that the free spring action in draft is greater than in buff and the frictional capacity is greater in buff than in draft.

A still further object of the invention is to provide a friction shock absorbing mechanism having spring action in both draft and buff, followed by frictional resistance, so designed that the shock absorbing action in draft is mainly in the form of free spring resistance, followed by frictional resistance of short duration, and in buff is mainly in the form of high frictional resistance preceded by preliminary spring resistance of relatively short duration, thus furnishing the high shock absorbing capacity demanded in buff and the relatively softer action demanded in draft, and still retain some frictional capacity in draft to take care of abnormally heavy shocks which are at times encountered.

Another object of the invention is to provide a shock absorbing mechanism for railway draft riggings having preliminary spring action followed by higher frictional resistance, so arranged and designed that the preliminary spring action is had during the major portion of the compression stroke in draft, followed by frictional resistance during the remainder of the stroke, and preliminary spring action is had during the minor part of the compression stroke in buff, followed by high frictional capacity during the remainder or major portion of the buff stroke.

A more specific object of the invention is to provide a friction shock absorbing mechanism for railway draft riggings, cooperating with the usual front and rear stop lugs and yoke of the rigging, and comprising a friction casing having a friction clutch telescoped within one end of the casing in frictional engagement with the interior thereof, a preliminary spring follower slidingly telescoped within the other end of the casing, and spring means within the casing yieldingly opposing inward movement of the spring follower and friction clutch, wherein movement of the spring follower inwardly of the casing is greater in draft than in buff, and the movement of the friction clutch inwardly of the casing is greater in buff than in draft, thereby providing the required relatively soft action in draft and the high shock absorbing capacity demanded in buff.

Other objects of the invention will more clearly appear from the description and claims hereinafter following.

Figure 2:
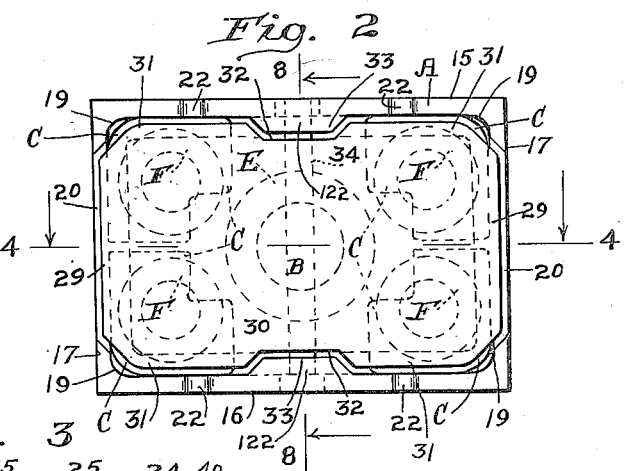
Figure 3:
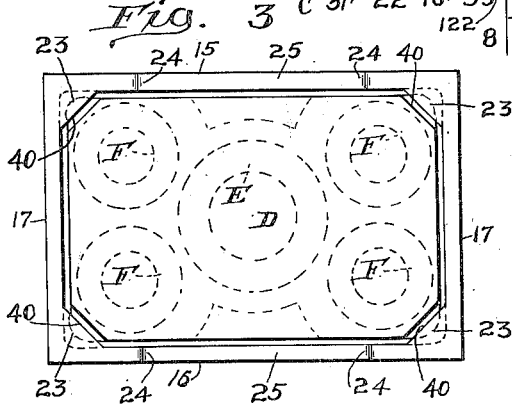

In the accompanying drawings forming a part of this specification, Figure 1 is a horizontal, longitudinal sectional view through the underframe structure at one end of a railway car, illustrating my improved shock absorbing mechanism in connection therewith, the shock absorbing mechanism being shown in plan. Figure 2 is a front elevational view of the shock absorbing mechanism shown in Figure 1, looking from left to right in said figure. Figure 3 is a rear elevational view of the shock absorbing mechanism shown in Figure 1, looking from right to left in said figure. Figure 4 is a view similar to Figure 1, showing the shock absorbing mechanism in horizontal section, on the line 4—4 of Figure 2, said view illustrating the mechanism as partly compressed in draft. Figure 5 is a view, similar to Figure 4, showing the mechanism fully compressed in draft. Figures 6 and 7 are views similar to Figure 4, respectively showing the mechanism partly and fully compressed in buff. Figure 8 is a vertical, longitudinal sectional view of the friction casing of my improved mechanism. Figure 9 is a rear elevational view of the wedge member of the shock absorbing mechanism illustrated in Figures 1 to 7 inclusive. Figure 10 is a front elevational view of one of the friction shoes. Figure 11 is a side elevational view of the shoe shown in Figure 10.

In said drawings, 10—10 indicate the channel-shaped draft sills of a railway car underframe, provided with the usual front and rear stop lugs 11—11 and 12—12. The yoke 14 of the railway draft rigging, which is operatively connected to the usual coupler, not shown, encloses my improved shock absorbing mechanism.

My improved shock absorbing mechanism, as shown in the drawings, comprises broadly a friction casing A, a wedge block B, a set of four friction shoes C—C—C—C, a spring follower D, a central or inner spring E, and four outer springs F—F—F—F at opposite sides of the spring E.

The friction casing A is in the form of a rectangular, boxlike shell, open at its front and rear ends and having lengthwise extending, horizontally disposed, vertically spaced, top and bottom walls 15 and 16, and lengthwise extending, laterally spaced, vertical side walls 17—17. At the forward end thereof, the top, bottom, and side walls are inwardly thickened, said inwardly thickened wall portions presenting interior, longitudinally extending, inwardly converging friction surfaces 18—18—18—18. At the four interior corners of the casing, the meeting edges of the friction surfaces are preferably rounded off, as indicated at 19. At the forward or friction end of the casing A, the side walls of the same are cut out, or inwardly slotted, lengthwise, as indicated at 20—20, to accommodate the wedge block B for sliding movement inwardly of the casing, the vertical inner end walls of these slots, which are indicated by 21—21, serving as stop shoulders for restricting inward movement of the wedge block. At the forward end of the casing, the top and bottom walls are also cut out, or inwardly slotted, lengthwise of the casing, as indicated at 22—22, to accommodate the front end of the yoke for movement inwardly of the casing, the transverse inner end walls of the slots 22—22, which walls are indicated by 122—122, serving as stop shoulders for restricting inward movement of the yoke. At the rear end of the casing, at the four corners thereof, the same is provided with inturned wall portions or flanges 23—23—23—23 in the form of webs, extending across the corners thereof, which act as stop shoulders for restricting outward movement of the spring follower D, as hereinafter pointed out. The top and bottom walls of the casing are also centrally cut out, or inwardly slotted, as indicated at 24—24, to accommodate the rear end portion of the yoke 14 for movement inwardly of the casing to a predetermined extent, the transverse inner end walls of the slots 24—24, which walls are indicated by 25—25, forming stop shoulders for limiting inward movement of the yoke.

The wedge block B is of generally rectangular outline in transverse section and has inwardly converging, top and bottom, substantially flat wedge faces 26—26 and inwardly converging, substantially flat wedge faces 27—27 at opposite sides thereof. The wedge faces 26—26 and 27—27 merge at the four corners of the block, thus providing, in effect, a surface of V-shaped transverse section at each corner of the block. The inner end of the block B presents a flat transverse face 28, which serves as an abutment for the front end of the inner spring E. At the front end, the block B is provided with laterally projecting wings or flanges 29—29 at opposite sides thereof, which are of such a vertical height as to be slidingly accommodated in the slots 20—20 of the side walls of the casing A. The front end of the wedge block B presents a substantially flat face 30, which extends transversely thereof and is continuous with the front faces of the flanges 29—29. The face 30 is adapted to receive the actuating force from the yoke 14 of the draft rigging, and cooperates with the front stop lugs 11—11 to limit forward or outward movement of the wedge block. The front end of the block is also provided with vertically projecting, transversely extending, top and bottom flanges 31—31, which are cut away, or recessed, at their mid portions, as indicated at 32—32, to provide clearance for interior enlargements 33—33 on the top and bottom walls 15 and 16 of the casing.

The wedge block B is anchored to the casing by a vertically disposed retaining rivet pin 34 engaged loosely through a lengthwise extending, central slot 35 in the block B and extending through suitable openings provided in the inwardly enlarged or thickened portions 33—33 of the top and bottom walls of the casing. As will be evident, the pin 34 positively limits outward movement of the wedge block by engagement with the inner end wall of the slot 35 of said block.

The four friction shoes C—C—C—C are interposed between the wedge block B and the friction surfaces of the casing, one shoe being disposed at each corner of the casing and having a friction surface 36 of V-shaped, transverse section on its outer side engaged with and fitting the friction surfaces 18—18 of the casing at said corner. On the inner side, each shoe has a wedge face 37 of V-shaped, transverse section, correspondingly inclined to and engaging the V-shaped wedge face formed at the corresponding corner of the wedge block B. At the inner end, each shoe presents a flat, transverse face 38 which forms an abutment for the corresponding outer spring F.

The spring follower D is in the form of a heavy rectangular plate, slidingly telescoped within the rear end of the casing. The four corners of the spring follower D are overlapped by the flanges 23—23—23—23 at the four corners of the casing, and outward movement of the spring follower is limited by engagement with these flanges. The spring follower D normally projects beyond the rear end of the casing A and the four corners of the spring follower are recessed to provide seats 40—40—40—40, which accommodate the flanges 23—23—23—23 in the projected position of the spring follower.

The inner spring E and the four outer springs F—F—F—F are in the form of helical coils arranged within the casing A, the spring E being interposed between the spring follower D and the wedge block B, and the four springs F—F—F—F being disposed at the four corners of the casing and interposed between the spring follower D and the shoes C—C—C—C. The inner spring E, which is heavier than the outer springs, has its front and rear ends bearing, respectively, on the inner end of the block B and the spring follower D, and each outer spring has its front and rear ends bearing, respectively, on one of the shoes C and the spring follower D.

The springs E and F are under initial compression and normally hold the wedge B and the spring follower D in the projected positions shown in Figure 1 in engagement with the front and rear stop lugs 11 and 12 of the draft rigging, and the wedge and spring follower, in turn, through their shouldered engagement with the casing, hold the same with its front and rear ends spaced from the front and rear stop lugs, as shown in Figure 1. The parts of the mechanism are preferably so proportioned that the front end of the casing A is normally spaced from the front stop lugs a distance which is greater than the spacing of the rear end of the casing and the rear stop lugs.

In assembling the mechanism, the spring follower D is first placed within the rear end of the casing by entering the same in inclined or angled position to clear the flanges 23 at the corners of the casing. After the follower D has been inserted and righted to engage in back of the flanges 23, the springs E and F, shoes C, and the wedge block B are placed within the casing through the open front end thereof, with the flanges 29—29 of the wedge block aligned with the slots 20—20 of the side walls of the casing A. After the parts have been assembled, the wedge block B is anchored by the rivet pin 34.

The operation of my improved shock absorbing mechanism is as follows: In draft action, the yoke 14 is pulled forwardly by the coupler and, as the yoke moves forwardly, the spring follower D, which is engaged by the rear end of the yoke, is forced inwardly of the casing A, resisted by the springs E and F. During this part of the draft stroke of the mechanism, purely free spring action is provided, the casing A remaining stationary, there being no movement between the casing and friction shoes due to the static friction between the shoes and casing, and the wedge block B being held against forward movement by the front stop lugs of the draft rigging. This free spring action continues until the parts reach the position shown in Figure 4 and the rear end portion of the yoke comes into engagement with the inner end walls 25—25 of the slots 24—24 at the rear end of the casing. Upon the casing being thus engaged by the yoke, the same is carried forwardly in unison with the yoke, forcing the wedge and shoes inwardly of the casing against the resistance of the springs E and F, thereby providing high frictional resistance. This action continues until the movement of the casing is positively limited by engagement with the front stop lugs, as shown in Figure 5.

As will be evident, the improved mechanism thus provides purely free spring action during the greater part of the compression stroke in draft, followed by frictional resistance during the smaller remaining part of the stroke, thus giving the desirable soft cushioning action in draft and yet having in reserve sufficient capacity in the form of frictional resistance to take care of unusually heavy shocks.

In buff, the coupler moves inwardly or rearwardly, carrying the yoke 14 therewith. As the yoke moves rearwardly, it forces the wedge B, which it engages, rearwardly also. The force is transmitted through the wedge and shoes to the casing A, moving the latter rearwardly in unison with the drawbar, the static friction between the casing and shoes preventing relative movement of the wedge and shoes with respect to the casing during this action. As the casing is forced rearwardly, the springs E and F are compressed against the spring follower D, which is held stationary by the rear stop lugs 12—12. Purely free spring action is thus provided until the rear end of the casing engages the rear stop lugs, that is, until the parts reach the position shown in Figure 6. The free spring action provided is thus had for a relatively short portion of the compression stroke in buff. During further compression of the mechanism in buff, the wedge B and friction shoes C are forced inwardly of the casing, which is held stationary by the rear stop lugs, thereby providing the high frictional resistance which is so essential to take care of heavy buffing shocks.

As the wedge block is forced inwardly of the casing by the drawbar, the flanges of the same pass into and slide lengthwise along the slots 20—20 of the side walls of the casing, thereby affording relatively long travel for the wedge block with resultant high frictional resistance during the major portion of the compression stroke in buff. As will be evident, the required rearward movement of the yoke 14 during buff is permitted by the slots 22—22 in the top and bottom walls of the casing. This action continues until the inward movement of the parts is arrested by engagement of the front section of the yoke with the inner end walls 122—122 of the slots 22—22.

When the actuating force is reduced in either draft or buff, the expansive action of the springs E and F restores all of the parts to the normal full release position shown in Figure 1, the wedge block B being forced outwardly until arrested by the pin 34, and the spring follower D being forced outwardly until arrested by the stop flanges 23. Inasmuch as the wedge block B shoulders against the front stop lugs 11—11 and the spring follower D shoulders against the rear stop lugs 12—12 of the draft sills, when the mechanism reaches its normal full release position, the casing A is brought to the position shown in Figure 1 with its front and rear ends spaced from the front and rear stop lugs 11—11 and 12—12.

In the embodiment of the invention illustrated in the drawings, the parts are shown as proportioned so that, in compression of the springs in the free spring action of the mechanism, the spring follower D is movable forwardly with respect to the casing a distance of 1½ inches in draft and the casing is movable rearwardly with respect to the spring follower a distance of only ¼ inch in buff, and in forcing the friction clutch, comprising the wedge and shoes, inwardly of the casing, against the resistance of the springs, the casing is movable forwardly with respect to the clutch a distance of 1 inch in draft and the clutch is movable rearwardly with respect to the casing a distance of 2¼ inches in buff. In other words, the free spring action in draft takes place during approximately 1½ inches of the usual 2½ inch compression stroke and the frictional resistance during the remaining inch of the compression stroke, and the free spring action in buff takes place during approximately ¼ of an inch of the usual 2½ inch compression stroke and the frictional resistance during the remaining 2¼ inches of the stroke.

As will be evident, although the mechanism, as illustrated in the drawings, provides for 1½ inches of free spring action and 1 inch of frictional travel in draft, and ¼ inch free spring action and 2¼ inches of frictional travel in buff, during the usual standard compression stroke of 2½ inches, by altering the arrangement of the different stops of the mechanism, the combinations of the proportionate free spring and frictional travel during the compressing stroke of 2½ inches may be varied as desired in both buff and draft to meet any given condition which may be encountered in service.

I claim:

1. In a combined spring and friction shock absorbing mechanism for railway draft riggings, the combination with front and rear stops; of a friction casing lengthwise movable between said stops; a friction clutch slidingly telescoped within the front end of the casing; a spring follower slidingly telescoped within the rear end of the casing; stop means on said casing limiting outward movement of the clutch with respect to the casing; a second stop means on said casing limiting outward movement of the spring follower with respect to the casing; spring means within the casing yieldingly opposing inward movement of said clutch and spring follower, said spring means normally holding said clutch and spring follower in projected position, limited by said first and second named stop means, and shouldered against said front and rear stops, respectively; a lengthwise movable yoke, said yoke engaging the clutch in buff to force the same rearwardly, said yoke engaging the spring follower in draft to move the same forwardly; means on said casing limiting forward movement of the yoke with respect to the casing; and means on said casing engaged by said yoke for limiting movement of the yoke and clutch rearwardly with respect to the casing.

2. In a combined spring and friction shock absorbing mechanism for railway draft riggings, including a lengthwise movable yoke, and front and rear stops, the combination with a friction casing interposed between said front and rear stops of the rigging; of a friction clutch slidingly telescoped within one end of the casing; a spring follower slidingly telescoped within the other end of the casing; spring means within the casing yieldingly opposing movement of the clutch and spring follower toward each other; means on said casing for limiting outward movement of said clutch and spring follower with respect to the casing, said clutch and spring follower in their limits of outward movement with respect to the casing being in abutment with said front and rear stop lugs respectively, to hold the front and rear ends of said casing spaced from said front and rear stops, said spring follower having movement inwardly with respect to the casing in buff, which is limited by engagement of the rear end of the casing with said rear stops, said spring follower being movable inwardly of the casing by said yoke in draft; and stop means on said casing engageable by said yoke in forward movement in draft after said spring follower has been moved inwardly of the casing to a predetermined extent greater than the movement thereof in buff, for effecting movement of said casing in unison with said yoke to force said friction clutch inwardly of the casing until limited by engagement of the casing with said front stops, said clutch being movable inwardly of the casing in buff after movement of the casing has been arrested by said rear stops, said inward movement of the clutch being greater in buff than in draft.

3. In a combined spring and friction shock absorbing mechanism for railway draft riggings including front and rear fixed stops, and a lengthwise movable yoke, the combination with a friction casing interposed between said front and rear fixed stops; of a friction clutch slidingly telescoped within the front end of the casing, said clutch including a wedge block having a follower portion normally bearing on said front stops; a spring follower slidingly telescoped within the rear end of the casing, said spring follower being movable forwardly in unison with said yoke; spring means within the casing yieldingly opposing inward movement of the clutch and spring follower toward each other; means on said casing having shouldered engagement with said wedge and spring follower, respectively, for limiting lengthwise separation of said clutch and spring follower and maintaining the front and rear ends of the casing normally spaced from said front and rear stops; stop means at the forward end of the casing spaced rearwardly from the front end thereof for limiting inward movement of the yoke; and stop means on said casing inwardly of the rear end thereof with which said yoke is engageable to arrest relative movement of the yoke and casing in draft and limit inward movement of the spring follower.

4. In a combined spring and friction shock absorbing mechanism for railway draft riggings including front and rear fixed stops, and a lengthwise movable yoke, the combination with a friction casing; of a spring follower slidingly telescoped within the rear end of the casing, said follower being engaged by the yoke in draft to effect movement of the same inwardly of the casing; a friction clutch including a central wedge block slidingly telescoped within the front end of the casing, said wedge block and spring follower normally projecting from opposite ends of the casing and engaging said front and rear stop lugs; means on said casing for limiting the amount of projection of said wedge block and the amount of projection of said spring follower; spring means within the casing yieldingly resisting inward movement of said clutch and spring follower; inwardly extending guide slots in said casing at the forward end thereof, accommodating said follower portion of the wedge block for movement rearwardly of the casing; and inwardly extending guide slots at the rear end of the casing accommodating the yoke for movement inwardly of the casing in draft.

5. In a combined spring and friction shock absorbing mechanism for railway draft riggings, including front and rear stop lugs, and a lengthwise movable yoke, the combination with a friction casing between said front and rear stop lugs, said friction casing having its front and rear ends normally spaced from said front and rear stop lugs, respectively; a spring follower slidingly telescoped within the rear end of the casing and normally bearing on said rear stop lugs, said spring follower being engaged and movable inwardly of the casing by said yoke in draft; a friction clutch including a wedge block having a follower portion normally bearing on said front stop lugs, said clutch being slidingly telescoped within the front end of the casing; springs within the casing yieldingly opposing movement of the clutch and spring follower toward each other, said wedge block being movable rearwardly with said yoke in buff, the front end of said casing having inwardly extending guide openings to accommodate said follower portion of the wedge and said yoke for movement inwardly of the casing, said rear end of the casing having inwardly extending guide openings for accommodating said yoke for movement inwardly of the casing in draft; and shoulders on said casing limiting inward movement of said yoke with respect to the casing in draft.

6. In a combined spring and friction shock absorbing mechanism for railway draft riggings, including front and rear stop lugs, and a lengthwise movable yoke, the combination with a friction casing open at its front and rear ends; of a spring follower slidingly telescoped within the rear end of the casing; stop flanges on the rear end of the casing limiting outward movement of the spring follower in projected position with respect to the casing, said spring follower being engaged by the yoke in draft to be moved inwardly of the casing, said casing being slotted at its rear end to accommodate said yoke for movement inwardly beyond the rear end of the casing in draft; a friction clutch slidingly telescoped within the front end of the casing, said clutch including a wedge block having a follower portion cooperating with said front stop lugs, said casing being recessed at its front end to accommodate said follower portion of the wedge block for movement inwardly of the front end of the casing; stop means at the front end of the casing limiting outward movement of the wedge block in projected position with respect to the front end of the casing with the follower portion thereof bearing on said front stop lugs; and spring means within the casing yieldingly opposing inward movement of the clutch and spring follower toward each other.

7. In a combined spring and friction shock absorbing mechanism for railway draft riggings, including front and rear stop lugs, and a lengthwise movable yoke, the combination with a friction casing lengthwise movable between said front and rear stop lugs, said casing having its rearward movement limited by engagement with said rear stop lugs and its forward movement limited by engagement with said front stop lugs; of a friction clutch movable rearwardly with said yoke in buff, said clutch including a wedge block having a follower portion normally bearing on said front stop lugs, said wedge block being movable rearwardly in buff in unison with said yoke; a spring follower slidingly telescoped within the rear end of the casing and normally bearing on said rear stop lugs; spring means within the casing yieldingly opposing relative movement of the clutch and spring follower toward each other, said casing being movable rearwardly with said clutch in buff to force said spring follower inwardly of the casing, and having its rearward movement limited by engagement with said rear stop lugs, said clutch being further movable inwardly of the casing after movement of said casing has been arrested in buff, said spring follower being movable in unison with said yoke inwardly of the casing in draft to a predetermined extent greater than the inward movement thereof in buff; and stop means on said casing engaged by said yoke arresting relative movement of the yoke and casing in draft when said follower is moved inwardly to a predetermined extent to move said casing forwardly with respect to the friction clutch until arrested by engagement with said front stop lugs.

8. In a combined spring and friction shock absorbing mechanism for railway draft riggings, including front stops, and rear stops spaced a predetermined distance from said front stops, the combination with a friction casing interposed between said front and rear stops, said casing being of lesser overall length than the distance between said front and rear stops, and being lengthwise movable between said stops and engageable therewith to limit lengthwise movement of the casing; a friction clutch slidingly telescoped within the front end of the casing, said clutch including a wedge block normally projecting beyond the front end of the casing; and a spring follower slidingly telescoped within the rear end of the casing and normally projecting beyond said rear end, the overall normal length of said mechanism with the clutch and spring follower projected corresponding to the spacing of said front and rear stops, said wedge of said clutch and said spring follower having portions engageable with said front and rear stops, respectively, said clutch being movable inwardly of the casing to a greater extent in buff than in draft, and said spring follower being movable inwardly of the casing to a greater extent in draft than in buff.

9. In a combined spring and friction shock absorbing mechanism for railway draft riggings, including front stops, and rear stops spaced from said front stops, the combination with a friction casing lengthwise movable between said stops and engageable therewith to limit forward and rearward movement thereof; of a friction clutch slidingly telescoped within the front end of the casing and adapted to receive the actuating force in buff to be moved rearwardly, said clutch being movable inwardly of the casing to a predetermined maximum extent; a spring follower slidingly telescoped within the rear end of the casing, said spring follower receiving the actuating force in draft to be moved forwardly, said spring follower being movable inwardly of the casing to a predetermined maximum extent; and spring means within the casing yieldingly opposing inward movement of said clutch and spring follower toward each other, said spring means holding the clutch in gripping engagement with the casing, said casing having its movement in draft limited by engagement with said front stops to restrict relative movement of the clutch and casing to less than said predetermined maximum, and said casing having its movement in buff limited by engagement with said rear stops to restrict relative movement of the spring follower and casing to less than said predetermined maximum.

10. In a railway draft rigging, the combination with front and rear stop lugs; of a friction casing interposed between said front and rear stop lugs, said casing being lengthwise movable between said lugs; a friction clutch slidingly telescoped within the front end of the casing, said clutch normally projecting beyond the front end of the casing and engaging said front stop lugs; and a spring follower slidingly telescoped within the rear end of the casing, said spring follower normally projecting beyond the rear end of the casing and engaging said rear stop lugs, said casing having its forward movement with respect to the clutch limited by engagement with said front stop lugs, said casing having its rearward movement limited with respect to the spring follower by engagement with said rear stop lugs, said spring follower having movement inwardly of the casing in draft exceeding the relative movement of said casing and spring follower in buff.

11. In a railway draft rigging, the combination with front and rear stop lugs; of a friction casing interposed between said front and rear stop lugs, said casing being lengthwise movable between said lugs; a friction clutch slidingly telescoped within the front end of the casing, said clutch normally projecting beyond the front end of the casing and engaging said front stop lugs; and a spring follower slidingly telescoped within the rear end of the casing, said spring follower normally projecting beyond the rear end of the casing and engaging said rear stop lugs, said casing having its forward movement with respect to the clutch limited by engagement with said front stop lugs, said casing having its rearward movement limited with respect to the spring follower by engagement with said rear stop lugs, said spring follower having movement inwardly of the casing in draft exceeding the relative movement of said casing and spring follower in buff, inward movement of the friction clutch with respect to the casing in buff exceeding the relative movement of said casing and clutch in draft.

ROLAND J. OLANDER.

REFERENCES CITED

The following references are of record in the file of this patent:

UNITED STATES PATENTS

| Number | Name | Date |
|---|---|---|
| 707,820 | Bush | Aug. 26, 1902 |
| 2,281,270 | Cottrell | Apr. 28, 1942 |
| 2,402,146 | Cardwell | June 18, 1946 |